United States Patent [19]

Nash

[11] Patent Number: 4,930,615
[45] Date of Patent: Jun. 5, 1990

[54] BUNDLE TURNING UNITS FOR USE WITH CONVEYORS

[75] Inventor: Kenneth M. Nash, Buckinghamshire, England

[73] Assignee: Packseal Industries Limited, Maidenhead, England

[21] Appl. No.: 324,250

[22] Filed: Mar. 15, 1989

[30] Foreign Application Priority Data

Mar. 16, 1988 [GB] United Kingdom ............... 8806213

[51] Int. Cl.⁵ .............................................. B65G 47/24
[52] U.S. Cl. .................................. 198/411; 198/416; 198/636
[58] Field of Search ............. 198/400, 401, 411, 416, 198/633, 636, 456

[56] References Cited

U.S. PATENT DOCUMENTS

| | | | |
|---|---|---|---|
| 3,332,531 | 7/1967 | Chaney | 198/416 |
| 3,432,023 | 3/1969 | Lucas | 198/416 |
| 3,786,908 | 1/1974 | Jones | 198/416 |
| 3,834,516 | 9/1974 | Reeser | 198/416 |
| 4,085,839 | 4/1978 | Crawford | 198/411 X |

FOREIGN PATENT DOCUMENTS

| | | | |
|---|---|---|---|
| 2810834 | 9/1979 | Fed. Rep. of Germany . | |
| 0023115 | 3/1981 | Japan | 198/411 |
| 288920 | 3/1971 | U.S.S.R. | 198/416 |

Primary Examiner—Robert J. Spar
Assistant Examiner—D. Glenn Dayoan
Attorney, Agent, or Firm—Renner, Kenner, Greive, Bobak, Taylor & Weber

[57] ABSTRACT

A bundle turning unit comprises a turnpost which is arranged in a vertical attitude with respect to the direction of feed of a bundle on a conveyor. The turnpost is movable at a controlled rate by a power-operated device between an advanced position in which the turnpost overlies the conveyor by a predetermined maximum distance and a retracted position spaced from the advanced position. The turnpost is moved between the advanced position and the retracted position as the bundle is advanced by the conveyor to cause the bundle to be turned through substantially 90° with respect to the plane of the conveyor.

10 Claims, 2 Drawing Sheets

BUNDLE TURNING UNITS FOR USE WITH CONVEYORS

This invention relates to bundle turning units for use with conveyors of the kind comprising a turnpost which is arranged in a generally vertical attitude with respect to the direction of feed movement of a bundle on a conveyor and with which the bundle is adapted to co-operate at such a position that the bundle is adapted to be turned in a turning cycle through substantially 90° with respect to the plane of the conveyor.

DESCRIPTION OF THE PRIOR ART

In one known turning unit of the kind set forth the turnpost is normally stationary. This has the disadvantage that it interferes with high speed flow of bundles and results in severe side loading on the transport system together with intermittent shock loading on the drive system. In addition, the centre of gravity of the product is moved relatively transversely during the turning cycle which results in the need for equipment receiving turned bundles to be offset transversely.

Turning units are also known in which the turnpost is spring-loaded into an operative position. This has the advantages that the turnpost is movable away from its operative position to absorb the shock loads and such movement enables the offset of the receiving equipment to be reduced in comparison with receiving equipment for use with stationary turnposts provided the weight of product is such as to overcome the spring pressure. Such known spring-loaded turnposts are weight sensitive and do not turn random weight bundles consistently. In addition the turn accuracy is dependent upon a bundle being correctly orientated before contact with the turnpost.

SUMMARY OF THE INVENTION

According to our invention, in a bundle turning unit of the kind set forth power-operated means are provided for moving the turnpost at a controlled rate in synchronism with the feed movement of the bundle between an advanced position in which the turnpost overlies the conveyor by a predetermined maximum distance and a retracted position spaced from the advanced position.

Moving the turnpost at the controlled rate reduces progressively the degree of obstruction to feed movement applied to the bundle by the turnpost so that as the turnpost reaches its retracted position the bundle has been turned through substantially 90° and is thereafter able to proceed substantially in a straight line.

By moving the turnpost at a controlled rate we are able to turn each of a plurality of bundles consistently about the centre of gravity. This has the consequent advantage that the equipment for receiving turned bundles need not be offset transversely since a relatively small movement of a bundle occurs in a lateral direction as it is being turned. In addition the feed speed can be increased since a more exact control is applied to each bundle during the turning cycle.

The turnpost may also be movable into a fully retracted position to one side of the feed path of a bundle. This enables the unit to be incorporated in packing systems in which a turning facility is required to be used only intermittently.

In one construction the turnpost is carried by the outer end of an arm which is movable through an arc lying in a plane parallel to the plane of the conveyor by operation of the power-operated means in order to move the turnpost in opposite directions between the advanced and retracted positions.

The turning unit may be used in combination with a bundle alignment unit with which a bundle is adapted to co-operate in conjunction with the turnpost in order to ensure that the bundle has been correctly orientated when received by receiving equipment.

The bundle alignment unit preferably comprises a squaring device in the form of a powered endless belt which is normal to the plane of the conveyor and of which the run is generally parallel to the direction of movement of the conveyor, the belt being driven to co-operate with a bundle and square it with respect to the conveyor by moving the bundle angularly and bodily with respect to the turnpost as an axis and to an extent determined by a stop which arrests angular movement of the bundle in that direction.

The squaring device is adapted to be brought into operation by synchronism with movement of the bundle and movement of the turnpost between its advanced and retracted positions.

Preferably the squaring device is carried by a pair of arms with which it forms a parallelogram linkage and by means of which the squaring device is movable bodily to effect squaring of a bundle, with the angular movement of the arms being synchronised with the arcuate movement of the turnpost.

The endless belt of the alignment unit is preferably trained only over head and tail rollers so that the belt can flex as necessary to accommodate badly formed products without the risk of bundles becoming jammed.

The squaring device is also movable into a fully retracted position to one side of the feed path of a bundle when the conveyor is to be used in a conventional manner.

BRIEF DESCRIPTION OF THE DRAWINGS

One embodiment of our invention is illustrated in the accompanying drawings in which.

DESCRIPTION OF THE PREFERRED EMBODIMENT

Figure 1:
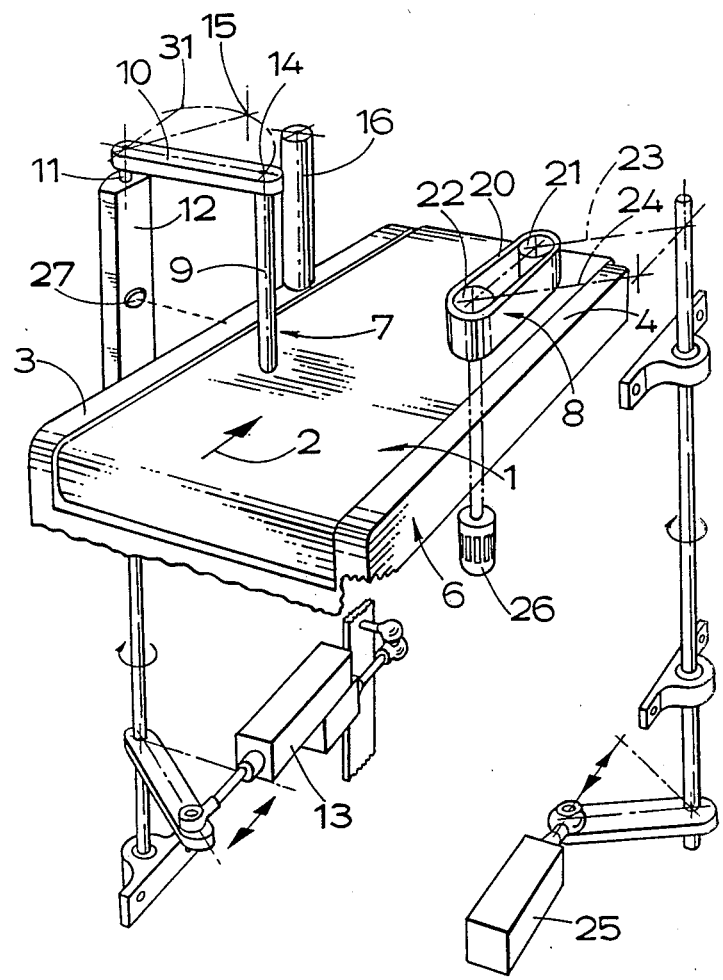
FIG. 1 is a perspective view of a belt conveyor provided with a bundle turning unit and a bundle alignment unit.

The belt conveyor illustrated in FIG. 1 of the drawings comprises a power driven endless belt 1 on which bundles in general and newspapers in particular are conveyed in the direction of the arrow 2 from a receiving station at one end of the conveyor to a discharge station at the other end of the conveyor. The belt 1 is guided between spaced side members 3, 4 of a rigid frame 6.

The conveyor is provided with a bundle turning unit 7, and a bundle alignment unit 8.

The bundle turning unit 7 comprises a generally vertical turnpost 9 which depends from one end of a generally horizontal arm 10. At its opposite outer end the arm 10 is rigid with a shaft 11 which, in turn, is journalled for rotation in an upstanding pillar 12. The shaft 7 is rotatable by means of a drive mechanism, suitably a pneumatic or hydraulic cylinder 13, or an electric motor, to move the turnpost 9 in opposite directions through an arc between an operative trailing position 14 in which it overlies the belt 1 by a distance less than half of the width of the belt 1, and a retracted leading position 15 spaced from or aligned with the edge of the belt 1. In the retracted position the turnpost 9 is generally aligned with a roller 16 which is journalled for free rotation about a vertical axis and is upstanding from the side member 3 at a position spaced forwardly from the retracted position 15 of the turnpost 9.

Figure 4:
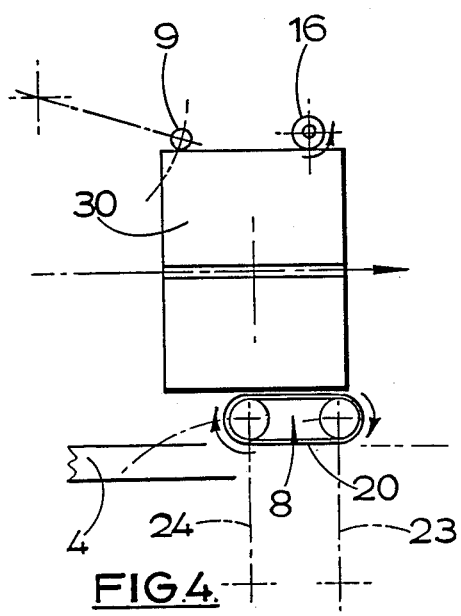
FIG. 4 illustrates a finally orientated bundle.

The bundle alignment unit 8 is located on the opposite side of the conveyor from the turning unit 7. The unit 8 comprises a relatively short endless belt 20 trained around head and tail rollers 21, 22 which are rotatable about generally vertical longitudinally spaced axes which lie in a plane normal to the direction of movement of the belt 1. The rollers 21 and 22 are carried from the frame 6 by a pair of parallel arms 23 and 24 with which the unit 8 forms a parallelogram linkage. The arms 23, 24 are movable through an arc between a retracted position, in which the unit 8 lies outside the belt 1 and the arms 23, 24 trail with respect to the movement of the belt 1 (FIG. 2), and a final operative position in which the unit 8 overlies the belt 1 and the arms are substantially normal to the direction of movement of the belt 1 (FIG. 4). The arms 23, 24 are powered in opposite directions, by a drive mechanism, suitably a pneumatic or hydraulic cylinder 25, or an electric motor (not shown). When the drive mechanism comprises a electric motor, it may also be adapted to drive the belt 20. Otherwise a separate electric motor 26 is provided.

The conveyor is provided with position sensing means for sensing the position of individual bundles being handled as they are conveyed by the conveyor. Such sensing means are adapted to initiate operation of the drive mechanisms 13,25,26. The position sensing means may comprise a photo-electric cell 27 of which the beam is broken by the passage of a bundle to initiate operation of the drive mechanisms.

Figure 2:
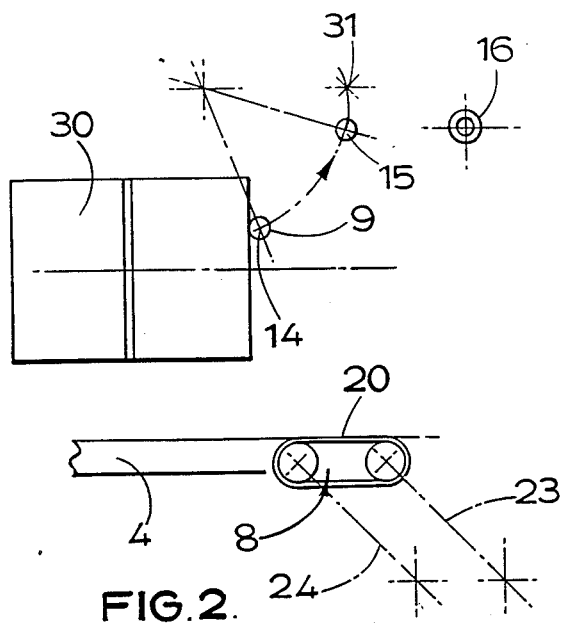
FIG. 2 is a schematic plan view of a bundle about to be turned by co-operation with a turnpost.

In an inoperative mode as shown in FIG. 2 of the drawings, the turnpost 9 is in its operative position 14 and the bundle alignment unit 8 is in its retracted position At substantially the instant a bundle 30 engages with the turnpost 9, the drive mechanisms are initiated to move the turnpost 9 in an arc towards the retracted position 15, and power the belt 20, at the same time moving the arms 23, 24 angularly as described above.

Figure 3:
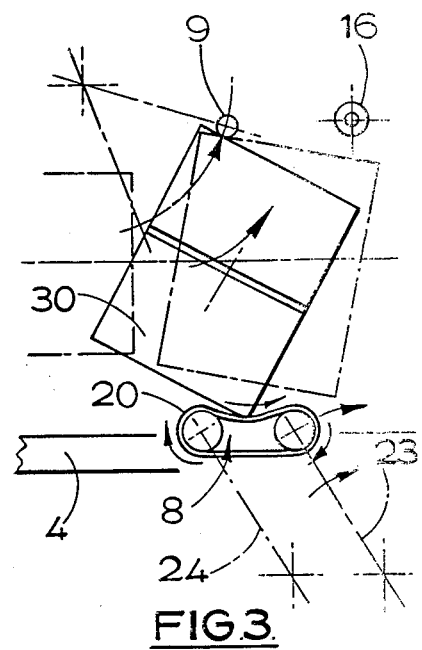
FIG. 3 shows a part turned bundle co-operating with the bundle alignment unit.

The motion of the belt 1 imparts a component of forward motion to the bundle 30 but due to the presence of the turnpost 9 the bundle tends to pivot about the turnpost 9 as an axis. However, since the turnpost 9 is driven through an arc towards its retracted position 15 in synchronism with the forward movement of the bundle 30, the effective length of the moment arm acting on the bundle 30 in a restraining direction is progressively reduced as the bundle 30 is advanced in a forward direction. This permits the bundle 30 to turn through substantially 90° about its centre of gravity. The movement of the bundle 30 substantially through 90° is facilitated by a complementary movement of the bundle alignment device 8. As illustrated in FIG. 3 of the drawings, a corner of the bundle 30 co-operates with the belt 20 and, due to the movement of the belt 20, the bundle 30 is carried forward by it with the bundle 30 being turned about its centre of gravity by co-operation with the turnpost 9 as described above. In synchronism with this, the arms 23 and 24 are moved angularly forwards to an extreme position as shown in FIG. 4 in which the inner run of the belt 20 overlies the belt 1 to a maximum extent. The bundle 30 is therefore squared with respect to the endless belt 1 by passage through a channel defined by the spacing between the turnpost 9 when in its retracted position, and the roller 16 on one side, and the belt 20 on the opposite side. The receiving equipment is therefore aligned with the direction of feed.

Since there is no structure behind the belt 20, the belt 20 is able to flex in order to accommodate badly formed products thereby avoiding the risk of a bundle jamming at its point or corner.

After the passage of a bundle through the channel as described above, the drive mechanisms 13, are reversed automatically to return the units 7 and 8 to their initial positions in order to manipulate the next and subsequent bundles on the conveyor in a manner similar to that described above.

The construction described above, besides turning correctly presented bundles through 90°, achieves a linear outfeed irrespective of the orientation of bundles being fed to the units 7 and 8. For example, if the bundle is fed in a diagonal attitude, the apparatus will turn it through an appropriate angle and square it into a linear outfeed. The flexure of the belt 22 can accommodate badly formed bundles, such as newspapers.

In the construction described above, the bundle turning unit 7 can be moved into fully retracted position 31 located outside the edge of the belt 1. This which enables the conveyor to be used in a conventional manner when the bundle alignment unit 8 is also located in its fully retracted position outside the opposite edge of the belt 1.

I claim:

1. A bundle turning unit for use with conveyors of the type for conveying bundles for movement in a feed direction, said turning unit comprising a turnpost, mounting means mounting said turnpost in a generally vertical attitude with respect to said movement of a bundle is adapted to co-operate such that in combination with the continuous movement of said conveyor said bundle is adapted to be turned in a turning cycle through substantially 90° with respect to the plane of said conveyor, wherein power-operated means are provided for moving said turnpost at a controlled rate through an arc lying in a plane parallel to the plane of said conveyor in synchronism with said feed movement of said bundle, said turnpost being movable by said power-operated means in at least a first direction between an advanced position in which said turnpost overlies said conveyor by a predetermined maximum distance and a retracted position spaced from said advanced position.

2. A bundle turning unit as claims in claim 1, wherein said power-operated means includes means adapted to move said turnpost into a fully retracted position to one side of said feed path of said bundle.

3. A bundle turning unit as claimed in claim 1, wherein said mounting means comprises an arm which is movable through an arc lying in a plane parallel to the plane of said conveyor by operation of said power-operated means, and said arm has an outer end from which said turnpost is carried whereby said turnpost is movable in opposite directions between said advanced and retracted positions as dictated by movement of said arm.

4. In combination with a conveyor of the type for conveying bundles for movement in a feed direction towards receiving equipment: a bundle turning unit, and a bundle alignment unit, wherein said turning unit comprises a turnpost, means for mounting said turnpost in a generally vertical attitude with respect to said movement of a bundle in said feed direction and with which said bundle is adapted to co-operate such that in combination with the continuous movement of said conveyor said bundle is adapted to be turned through substantially 90° with respect to the plane of the conveyor, and power-operated means for moving said turnpost at a controlled rate through an arc lying in a plane parallel to said plane of said conveyor in synchronism with said feed movement of said bundle, said turnpost being movable by said power-operated means in at least a first direction between an advanced position in which said turnpost overlies said conveyor by a predetermined maximum distance and a retracted position spaced from said advanced position, and wherein said bundle alignment unit operates in conjunction with said turning unit to co-operate with said bundle and thereby to ensure that said bundle is correctly orientated for reception by said receiving equipment.

5. The combination as claimed in claim 4, wherein a stop is adapted to arrest angular movement of said bundle, and wherein said bundle alignment unit comprises a squaring device in the form of a powered endless belt which is normal to said plane of said conveyor and has a run which is generally parallel to said direction of feed movement of said conveyor, and means for driving said belt to co-operate with said bundle and square it with respect to said conveyor by moving said bundle angularly and bodily with respect to said turnpost as an axis and to an extent determined by said stop which arrests angular movement of said bundle in that direction.

6. The combination as claimed in claim 5, wherein said stop comprises a roller which is journalled for rotation about a vertical axis and is spaced forwardly from said turnpost.

7. The combination as claimed in claim 6, wherein said turnpost and said stop are substantially aligned in a direction substantially parallel to said feed direction of said conveyor, at least when said turnpost is in its retracted position 8. The combination as claimed in claim 5, including means for bringing said squaring device into operation in synchronism with movement of said bundle and movement of said turnpost between said advanced and retracted positions.

9. The combination as claimed in claim 5, wherein said squaring device is carried by a pair of arms with which it forms a parallelogram linkage and by means of which said squaring device is movable bodily to effect squaring of said bundle, angular movement of said arms being synchronised with said movement of said turnpost between said advanced and retracted positions.

10. The combination as claimed in claim 5, wherein a channel through which a squared bundle is passed is defined between said turnpost and said fixed stop which are both disposed on one side of said conveyor, and said bundle alignment device which is disposed on the opposite side of said conveyor.

* * * * *

UNITED STATES PATENT AND TRADEMARK OFFICE
CERTIFICATE OF CORRECTION

PATENT NO. : 4,930,615

DATED : June 5, 1990

INVENTOR(S) : Kenneth M. Nash

It is certified that error appears in the above-identified patent and that said Letters Patent is hereby corrected as shown below:

On the title page, in item [73] Assignee: delete "Packseal" and substitute therefor --Pakseal--.

Signed and Sealed this

Thirteenth Day of April, 1993

Attest:

STEPHEN G. KUNIN

*Attesting Officer*  *Acting Commissioner of Patents and Trademarks*